UNITED STATES PATENT OFFICE.

EMILE AUGUST FOURNEAUX, OF MANCHESTER, ENGLAND, ASSIGNOR TO BADISCHE ANILIN & SODA FABRIK, OF LUDWIGSHAFEN-ON-THE-RHINE, GERMANY, A CORPORATION.

PROCESS OF OBTAINING PARANITRANILIN RED, &c.

No. 913,634.      Specification of Letters Patent.      Patented Feb. 23, 1909.

Application filed November 29, 1907. Serial No. 404,427.

*To all whom it may concern:*

Be it known that I, EMILE AUGUST FOURNEAUX, a citizen of the United States, residing at Melrose, Polygon Road, Crumpsall, Manchester, in the county of Lancaster, England, have invented new and useful Improvements in the Production of Red Shades on the Fiber, of which the following is a specification.

The so-called nitrosamin red, the inactive modification of paranitrodiazo-benzol, is mainly used at present for preparing the active modification of the said diazo compound, into which it is converted by treatment with acids. Methods for the direct production of paranitranilin red by printing or padding the fabric with a solution containing nitrosamin red and an alkaline betanaphthol solution have been recommended but have not found any practical application because the results obtained were unsatisfactory.

According to my invention I have found that good and reliable results are obtained by substituting for the alkaline naphthol solution in the above process a solution of the betanaphthol sulfuric acid described by Nietzki (*Ber.* 15, p. 305), also called 2-naphthol-1-sulfonic acid, in the form of one of its metallic salts. Nietzki there states that the said 2-naphthol-1-sulfonic acid does not combine with diazo compounds, but that a decomposition of the diazo compounds is brought about, traces only of coloring matter being formed owing to the production of betanaphthol through splitting off of the sulfonic acid group. Tobias, in German patent No. 74,688, states that freshly prepared and still moist diazobenzene-parasulfonic acid acts on a concentrated alkaline solution of 2-naphthol-1-sulfonic acid forming naphthol orange, the sulfonic acid group being split off from the naphthol compound and the diazo compound taking its place. The present invention utilizes this property of 2-naphthol-1-sulfonic acid of parting with its sulfo group in the presence of a diazo compound yielding an azo compound of betanaphthol to obtain para red on the fiber.

I prefer to carry out my invention by printing or padding the textile fiber with a suitable mixture of one of the metallic salts of the 2-naphthol-1-sulfonic acid and nitrosamin red, with or without the customary additions such as naphthol-mono-sulfonic acid F, Turkey red oil, castor oil soap, and so on, then drying, and steaming or allowing to lie until developed. By this method the customary naphthol preparing of the cloth is avoided. If desired, however, as an alternative process the cloth may be prepared with a suitable salt of the 2-naphthol-1-sulfonic acid with or without the additions mentioned and then printed or padded with nitrosamin red. The advantage of this latter process over the ordinary process (of preparing the cloth with an alkaline betanaphthol solution and printing with a solution of the active paranitrodiazobenzol) is based on the fact that the inactive diazo compound, nitrosamin red, is far more stable than the active compound, hence it works better in the printing machine and is less liable to decompose on the back grays, which can therefore be more readily cleaned.

Among the metallic salts of the betanaphthol sulfuric acid, some are more suitable than others, thus for instance the magnesium salts give a fuller and bluer shade of red than the sodium salt and the printing color keeps better. The basic magnesium salt, obtainable in solution by stirring a solution of the normal magnesium salt with an excess of precipitated magnesium hydroxid, yields better results than the normal salt.

The nitrosamin paste should preferably contain the nitrosamin in the form of its magnesium salt and this should also be as finely divided as possible. It can be obtained by treating sodium nitrosamin red with a magnesium salt such for instance as magnesium sulfate and magnesium chlorid.

This invention can be carried out when using either paranitrophenylnitrosamin or other nitrosamins suitable for producing coloring matter on the fiber, such for instance as the nitrosamins described in Letters Patent Nos. 531,974, 531,975, 531,976, and 531,977.

The following example will serve to illustrate further the nature of my invention and the method of carrying it into practical effect, but the invention is not confined to this example. The parts are by weight.

A. Dissolve thirty-six (36) parts of magnesium sulfate in one hundred (100) parts of gum tragacanth solution and stir in a mixture of one hundred and twenty-five (125) parts of a twenty-five (25) per cent. nitrosamin red paste and one hundred and eighty-three (183) parts of water.

B. Mix together four hundred (400) parts of gum tragacanth solution, twenty (20) parts of castor oil acid (obtainable by decomposing castor oil soap with acid), twenty (20) parts of turpentine, fifteen (15) parts of neutral acetin, and one hundred and three (103) parts of a solution of the basic magnesium salt of 2-naphthol-1-sulfonic acid obtainable by stirring a solution of the normal magnesium salt with excess of magnesium hydrate and containing about three hundred and sixty-four (364) grams of the basic salt per liter.

Shortly before use mix A and B together, print onto the material, dry, steam for one (1) minute without pressure, and wash and soap. Under some conditions, and particularly when pure nitrosamin is used, a small addition of urea, say one (1) part to one thousand (1,000) parts of the printing paste improves the results and particularly the fastness to steaming.

Now what I claim is:

1. The production of coloring matter on the fiber by applying to the fiber a 2-naphthol-1-sulfonic acid salt and a nitrosamin compound then splitting off the sulfonic acid group from the 2-naphthol-1-sulfonic acid converting the nitroso compound into the corresponding diazo compound and causing this diazo compound to combine with the 2-naphthol.

2. The production of coloring matter on the fiber by applying to the fiber a magnesium salt of 2-naphthol-1-sulfonic acid and a nitrosamin compound then splitting off the sulfonic acid group from the 2-naphthol-1-sulfonic acid converting the nitroso compound into the corresponding diazo compound and causing this diazo compound to combine with the 2-naphthol.

3. The production of coloring matter on the fiber by applying to the fiber a 2-naphthol-1-sulfonic acid salt and a nitrosamin compound and then drying and steaming substantially as described.

4. The production of coloring matter on the fiber by applying to the fiber a magnesium salt of 2-naphthol-1-sulfonic acid and a nitrosamin compound and then developing by drying and steaming substantially as described.

5. The production of coloring matter on the fiber by preparing the fiber with a 2-naphthol-1-sulfonic acid salt, then drying, then printing or padding with a nitrosamin compound, and finally developing by drying and steaming substantially as described.

6. The production of coloring matter on the fiber by applying to the fiber a 2-naphthol-1-sulfonic acid salt, a nitrosamin compound and urea and then developing by drying and steaming substantially as described.

7. The production of coloring matter on the fiber by applying to the fiber a magnesium salt of 2-naphthol-1-sulfonic acid, a nitrosamin compound and urea and then developing by drying and steaming substantially as described.

8. The production of coloring matter on the fiber by applying to the fiber a 2-naphthol-1-sulfonic acid salt and paranitrophenylnitrosamin and then drying and steaming substantially as described.

9. The production of coloring matter on the fiber by applying to the fiber a 2-naphthol-1-sulfonic acid salt, paranitrophenylnitrosamin and urea and then drying and steaming substantially as described.

10. The production of coloring matter on the fiber by preparing the fiber with a magnesium salt of 2-naphthol-1-sulfonic acid, then drying, then printing or padding with a nitrosamin compound and finally developing by drying and steaming substantially as described.

11. The production of coloring matter on the fiber by preparing the fiber with a magnesium salt of 2-naphthol-1-sulfonic acid, then drying, then printing or padding with a nitrosamin compound and urea and finally developing by drying and steaming substantially as described.

12. The production of coloring matter on the fiber by preparing the fiber with a magnesium salt of 2-naphthol-1-sulfonic acid, then drying, then printing or padding with paranitrophenylnitrosamin and finally developing by drying and steaming substantially as described.

13. The production of coloring matter on the fiber by preparing the fiber with a magnesium salt of 2-naphthol-1-sulfonic acid, then drying, then printing or padding with paranitrophenylnitrosamin and urea and finally developing by drying and steaming substantially as described.

In testimony whereof I have hereunto set my hand in the presence of two subscribing witnesses.

EMILE AUGUST FOURNEAUX.

Witnesses:
S. W. GILLETT,
HERBERT ROWLAND ABBEY.